United States Patent

Cheung

[11] Patent Number: 5,942,031
[45] Date of Patent: Aug. 24, 1999

[54] EXPANDING ADDITIVE FOR CEMENT COMPOSITION

[75] Inventor: Ping-Sun Cheung, Spring, Tex.

[73] Assignee: Nalco/Exxon Energy Chemicals, L.P., Sugar Land, Tex.

[21] Appl. No.: 08/762,848

[22] Filed: Dec. 10, 1996

[51] Int. Cl.$^6$ ................................................ C04B 9/00
[52] U.S. Cl. ..................... 106/801; 106/820; 166/293
[58] Field of Search ................... 106/713, 800, 106/801, 820; 166/293

[56] References Cited

U.S. PATENT DOCUMENTS

| | | | |
|---|---|---|---|
| 4,011,094 | 3/1977 | Burley | 106/801 |
| 4,797,159 | 1/1989 | Spangle | 106/718 |
| 4,877,452 | 10/1989 | Roussel et al. | 106/715 |
| 5,295,543 | 3/1994 | Terry et al. | 106/708 |
| 5,311,945 | 5/1994 | Cowan et al. | 106/690 |
| 5,327,968 | 7/1994 | Onan et al. | 106/796 |
| 5,332,041 | 7/1994 | Onan et al. | 106/789 |
| 5,501,277 | 3/1996 | Onan et al. | 106/706 |
| 5,547,024 | 8/1996 | Di Lullo Arias | 106/714 |

FOREIGN PATENT DOCUMENTS

| | | |
|---|---|---|
| 03618966 | 12/1987 | Germany . |
| 408188459 | 7/1996 | Japan . |

*Primary Examiner*—Paul Marcantoni
*Attorney, Agent, or Firm*—Margaret M. Brumm; Thomas M. Breininger

[57] ABSTRACT

Deadburned magnesium oxides (calcined at a temperature of above about 4000° F.) can be advantageously utilized as an expanding additive in cements utilized to seal a metallic casing into the bore hole of a well. The deadburned magnesium oxide additives are particularly effective when used in cements having a curing temperature of about 120–200° C. and particularly at temperatures greater than about 150° C.

8 Claims, No Drawings

EXPANDING ADDITIVE FOR CEMENT COMPOSITION

FIELD OF THE INVENTION

This invention is directed to an expandable cement composition and particularly an expandable cement composition useful for cementing a casing in place in a bore of an oil, gas or other well having a bottom hole temperature of greater than about 120° C. The expandable cement compositions of the invention employ as an expansion additive a magnesium oxide material which has been calcined at a temperature of greater than about 4000° F.

INTRODUCTION

A well-known practice in oil, gas, or other wells, which have a bore penetrating a number of earth formations, is to cement a steel casing in place within the bore by placing a cement slurry between the steel casing and the bore walls. Many cements, however, such as Portland Cement, experience a shrinkage upon setting, resulting in a poor mechanical bond between the casing and the bore wall. Such situation may allow undesirable fluid (which term as used herein includes liquids and gases) to communicate between different formation zones penetrated by the bore, or even allow fluids produced in certain zones to undesirably leak to the surface. Such situations can be even worse when temperature or pressure variations cause contraction of the casing.

A solution to the foregoing problem, is to compensate for the shrinkage of the cement by adding an expansive agent to the cement. Ideally, the expansive agent will overcompensate for the cement shrinkage which might otherwise occur, resulting in a net expansion. By "net expansion", or simply "expansion" of a cement, is meant that the unrestrained set cement will exhibit a volume increase over its liquid (i.e. slurry) phase. Such net expansion helps ensure a good cement bond to both the casing and the bore wall.

The expansive agent must be designed such that, at the temperature to which the liquid cement will be exposed, it does not attempt to produce most of its expansive effect while the cement is still liquid. If the effect of the expansive agent is expended while the cement is liquid, there will be no net expansion of the set cement. Furthermore, for practical reasons, it will often be desirable that the expansion in the set cement must be at a practical rate under the temperature and other conditions to which it is to be exposed in use. A generalized description of the current usage and commercial practices regarding cement expansion agents is found in Spangle, U.S. Pat. No. 4,797,159 the disclosure of which is hereinafter incorporated by reference into this specification.

As described in Spangle, in some wells, a relatively low bottom hole temperatures may initially or normally be present. However, subsequent procedures involving such wells may later raise their temperature at the bottom of the well substantially. Such can occur for example in geothermal wells or wells exposed to heat from fire flooding procedures. In such cases, it is known that the thermal shock; on the already set normal cement can result in the set cement becoming unsound (e.g., losing compressive strength). Further, while certain cement expansion additives perform well at certain temperatures and pressures, these cement additives may not perform well at elevated temperatures and pressures. It would be desirable then to have a cement composition which would at least not suffer as much from this thermal shock effect. It has been discovered that this may be accomplished by providing an expansive agent in the cement, which agent will produce most of its expansion as it sets at the elevated temperatures that may be encountered in the well.

The Spangle reference cited above discloses the utilization of certain magnesium oxide materials calcined at temperatures of from 1100° C. to 1500° C. at least 50% of the particles of which have a diameter greater than 30 microns and which has a surface area of about 0.8 to about 1.8 m$^2$/g.

While so called "light burned" or "hardburned" magnesium oxide expansive agents have performed well in certain situations, they have been found not to give the necessary linear expansion based on additive amount required to adequately cement or seal metallic casings into the well bore of a well at well temperatures of greater than about 120° C. Linear expansive properties at temperatures in this range is important because of the need to know the expansive characteristics of a given cement at a given set time. Expansive characteristics at temperatures greater than about 120° C. become increasingly important as deeper wells are drilled.

I have found that certain classes of magnesium oxide, specifically so called dead-burned magnesium oxide materials act as superior expansive agents for cement compositions at temperatures of greater than about 120° C. Accordingly, the deadburned magnesium oxide materials of this invention provide expansive characteristics to cement at temperatures greater than about 120° C. Further, and unexpectedly, the deadburned magnesium oxides of this invention provide a linear expansion for cement over the range of about 120° C. to about 200° C. at concentrations of magnesium oxide in the cement of from about 0.1–20 percent magnesium oxide based on the weight of the cement in the composition. While deadburned magnesium oxide compositions have been reportedly utilized in high phosphate specialty cements and in refractories which must be fired to produce a glass, they are not believed to have been utilized previously as cement additive compositions utilized to seal a metallic casing into the bore hole of a well. The term "deadburned" as used herein means calcined at a temperature of greater than about 4000° F.

It will be seen, that neither Spangle or the references cited by Spangle teach or suggest the expansive cement composition of the present invention, which is useful for cementing a casing within the wellbore of an oil, gas or other well, and contains as an expansive agent, magnesium oxide calcined at a temperature of greater than about 4000° F.

THE INVENTION

This invention in its most general form relates to a method for preventing the shrinkage of cement utilized to fill the are between a bore hole of a well and a metallic well casing which comprises adding to the cement, prior to placing between the bore hole and the well casing from 0.1–20 weight percent of a deadburned magnesium oxide. The invention also encompasses a cement composition useful for cementing the area between a bore hole of a well and a metallic well casing which comprises:

a. cement; and, b. from 0.1–20 weight percent based on the total weight of the cement composition of a finely divided deadburned magnesium oxide, said deadburned magnesium oxide having been calcined at a temperature greater than about 4000° F., and wherein said cement containing said magnesium oxide expands at a linear rate over the temperature range of 120–200° C.

The deadburned magnesium oxides of the present invention are commercially available from a number of sources. These materials can be manufactured by calcining naturally occurring magnesium oxide or carbonate deposits including periclase with or without other additives at temperatures of greater than about 4000° F. Materials meeting these classifications include those produced by Martin Marietta Corporation under the tradename MagChem® PSS. Those materials which are useful in the subject invention are stated to have the following properties by their manufacturer:

TABLE I

Properties of MagChem PSS

| SIZE | MgO % (1) | LOI, % | CaO, % | SiO$_2$, % | Fe$_2$O$_3$ % | Al$_2$O$_3$ % | B$_2$O$_3$ % | (2) | (3) | (4) |
|---|---|---|---|---|---|---|---|---|---|---|
| ¼ inch | 98.1 | 0.18 | 0.80 | 0.60 | 0.25 | 0.25 | 0.08 | 3.28 | 100% =1/4 | 13% −6 |
| ⅛ inch | 98.1 | 0.18 | 0.80 | 0.60 | 0.25 | 0.25 | 0.08 | 3.28 | 95% −6 | 16% −16 |
| fine grind | 98.1 | 0.18 | 0.80 | 0.60 | 0.25 | 0.25 | 0.08 | 3.28 | 95% −16 | 24% −100 |
| pulverized | 98.1 | 0.18 | 0.80 | 0.60 | 0.25 | 0.25 | 0.08 | 3.28 | 95% −50 | 75% −200 |

(1) Ignited basis
(2) Bulk Specific Gravity
(3) Top size, % passing US Sieve
(4) Bottom size, % passing US Sieve Deadburned magnesium oxide materials useful in this invention are also available under the tradename Magnesite™ DB87 Premier Services Corporation, Middlesburg Heights, Ohio.

While as seen above the deadburned magnesium oxide materials useful in the subject invention come in a variety of size materials, the effect of the magnesium oxide is not believed to be related to the size. In the practice of this invention it is preferred to utilize a material such as Magnesite DB87 which has a particle size of about +40 mesh 0.2%, −325 mesh 54%.

In the process of utilizing additives of the type described herein they are generally added to the solid cement mixture with other solid additives, and the resultant cement material containing additives is mixed to achieve a uniform distribution of the additive within the cement. The additive of the instant invention is generally added to the cement at a level of from 0.1–20 weight percent of the cement and preferably from 0.5–15 weight percent. Most preferably from 1–12 weight percent of the additive is utilized based on the weight of the cement.

The cements containing the additives of the instant invention are generally utilized in situations where the cement must cure at temperatures of about 120–200° C. and preferably at temperatures above about 150° C. where the deadburned magnesium oxide materials of the subject invention appear to give better expansion in cement than magnesium oxides calcined at lower temperatures.

The additives of the instant invention are useful as expansive additives in a variety of cements, and including those cements which are categorized as Portland Cements. While the additives are particularly useful in so called class "G" cement materials there is no reason to believe that the additives of the invention will not work in other cement materials, producing the same unexpected results. The additives of the invention may be used with other additives commonly used in the formulation of cement materials. These materials include set retarders, binders, dispersants, biocides, antifoams, and the like which are added to increase the set time of the cement, improve the processability of the cement, and the stability of the cement. The additive of the invention should pose no compatability problems when combined with additives of the type described. The use of additives of the types described are well known to those in the art, and it is beyond the scope of this application to describe all possible cement additives and their uses.

In order to exemplify the cement additives of the instant invention the following experiments were conducted.

EXAMPLE I

API class G cement was mixed with 35 percent by weight of silica sand (1), 100 percent by weight based on the cement of hematite(2), 0.75 percent by weight based on the cement of salt, 0.65 percent by weight based on the cement of retarder(3), 0.2 gallon dispersant(4)/sack cement, 2.5 gallon latex(5)/sack cement, 0.1 gallon latex stabilizer(6)/sack cement, 0.1 gallon defoamer(7)/sack cement and 2.68 gallon water/sack cement. The cement was made using varying quantities of the deadburned magnesium oxide of the subject invention along with magnesium oxide materials that had been calcined at lower temperatures. The cement was cured, and properties measured utilizing a Nordmann Cement Curing Chamber. Curing conditions were 312° F. and 3000 psi pressure. Results are shown below in Table II.

TABLE II

| MgO | Calcination Temperature (F.) | Concentration of Additive in cement | % Expansion in 24 hours |
|---|---|---|---|
| lightburned- very reactive | 1600–1800 | 2.5 | 0.3 |
| lightburned - reactive | 1600–1800 | 2.5 | 0.3 |
| hardburned | 2800–3000 | 2.5 | 0.7 |
| hardburned | 2800–3000 | 5.0 | 2.6 |
| deadburned | >4000 | 2.5 | 2.1 |
| deadburned | >4000 | 5.0 | 3.4 |

(1) 100 mesh particle size
(2) <200 mesh
(3) Dowell Schlumberger D28 available from Dowell Schulmberger, Houston, Texas
(4) Dowell Schlumberger D80
(5) Dowell Schlumberger D600
(6) Dowell Schlumberger D135
(7) Dowell Schlumberger D47

EXAMPLE II

As a result of the results obtained above, several additional experiments were conducted using deadburned magnesium oxide materials obtained from different sources and having different properties. The cement utilized was of the same composition as indicated in Example I and cured using the same conditions. Deadburned magnesium oxide was added at a level of 5% by weight of the cement. Results are shown in Table III.

TABLE III

| Deadburned MgO | Raw Material Source | MgO content (%) | % Expansion 24 hours |
|---|---|---|---|
| MgO (A) | MgCO3 mine | 87 | 4.48 |
| MgO (B) | MgCO3 mine | 95 | 3.65 |
| MgO (C) | Magnesium Rich brine | 98 | 3.57 |

EXAMPLE III

Additional work was done utilizing the magnesium oxide designated as "A" in Table III. This work was done utilizing the same cement materials and cure conditions as Example I. Results are shown in Table IV.

TABLE IV

| Percentage MgO (A) | % Expansion at 24 hours |
|---|---|
| 1.5 | 0.26 |
| 3.0 | 2.61 |
| 5.0 | 4.48 |
| 10.0 | 6.31 |

EXAMPLE IV

Additional work was conducted utilizing MgO (A) and curing the resultant cement over a range of temperatures at 3000 psi and varying the amount of the retarder composition specified above. This work was conducted on a different class G API cement, composed of the cement, 35 percent by weight based on cement of a <200 mesh silica flour, retarder and 5 percent by weight based on the cement of deadburned MgO (A) and 52 percent by weight of the cement of water. The retarder utilized was Dowell Schlumberger D28. Results are shown in Table V below.

TABLE V

| CURING TEMP ° F. | RETARDER CONCENTRATION % | PERCENT EXPANSION | | |
|---|---|---|---|---|
| | | 1 DAY | 3 DAY | 7 DAY |
| 290 | 1.4 | 0.42 | 3.84 | 4.17 |
| 320 | 1.8 | 3.08 | 3.10 | 3.13 |
| 350 | 2.0 | 3.08 | | |
| 380 | 3.0 | 3.16 | | |

The above examples clearly show the superiority of using the deadburned magnesium oxide expansion additive in cement mixtures.

Having thus described my invention, I claim:

1. A method for preventing the shrinkage of cement utilized to fill the area between a bore hole of a well and a metallic well casing which comprises adding to the cement, prior to placing between the bore hole and the well casing from 0.1–20 weight percent of a deadburned magnesium oxide, said deadburned magnesium oxide having been calcined at a temperature of greater than about 4000° F.

2. The method of claim 1 wherein from 0.5–15 weight percent of deadburned magnesium oxide is added.

3. The method of claim 1 wherein from 1–12 weight percent of deadburned magnesium oxide is added.

4. A cement useful for cementing the area between a bore hole of a well and a metallic well casing which comprises:
   a. cement; and,
   b. from 0.1–20 weight percent based on the total weight of the cement composition of a finely divided deadburned magnesium oxide, said magnesium oxide having been calcined at a temperature greater than about 4000° F., and wherein said cement containing said magnesium oxide expands at a linear rate over the temperature range of 120–200° C.

5. The cement of claim 4 wherein from 0.5–15 weight percent deadburned magnesium oxide is added.

6. The cement of claim 4 wherein from 1–12 weight percent of deadburned magnesium oxide is added.

7. The method of claim 1 wherein the cement is a Portland Cement.

8. The cement of claim 6 wherein the cement is a Portland Cement.

* * * * *